June 11, 1940.  J. STEVENS  2,204,286

ORNAMENTAL INDOOR AERIAL

Filed March 30, 1939

Jacob Stevens:
INVENTOR

BY Victor J. Evans & Co.

ATTORNEYS

Patented June 11, 1940

2,204,286

UNITED STATES PATENT OFFICE 2,204,286

ORNAMENTAL INDOOR AERIAL

Jacob Stevens, New York, N. Y.

Application March 30, 1939, Serial No. 265,022

1 Claim. (Cl. 250—33)

The present invention relates to improvements in aerials for radio reception, and more particularly to aerials of the indoor type.

An important object of the invention resides in the provision of an aerial adapted for use indoors that is highly useful in purpose and ornamental in appearance.

A further object of the invention is to provide an indoor aerial comprising a multiplicity of individual wires disposed in a socket within a bowl-like receptacle, said receptacle being preferably supported on an ornamental pedestal whereby the combined unit presents an ornamentally attractive article. The invention further includes the mounting of artificial flowers on the ends of wires which extend beyond the edge of the bowl, thus providing a stem for supporting the leaves and blossoms of an artificial flower.

The invention will be fully and comprehensively understood from a consideration of the following detailed description when read in connection with the accompanying drawing which forms a part of the application.

Figure 1:
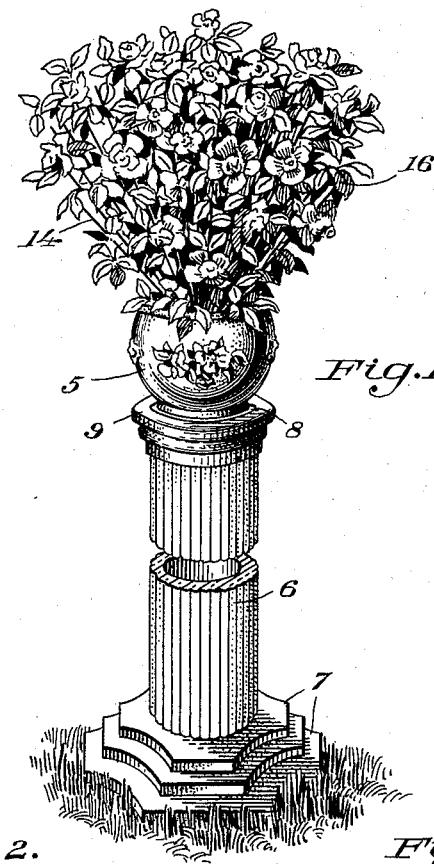
Figure 1 is a perspective view of an indoor aerial embodying the features of the present invention.
Figure 2:
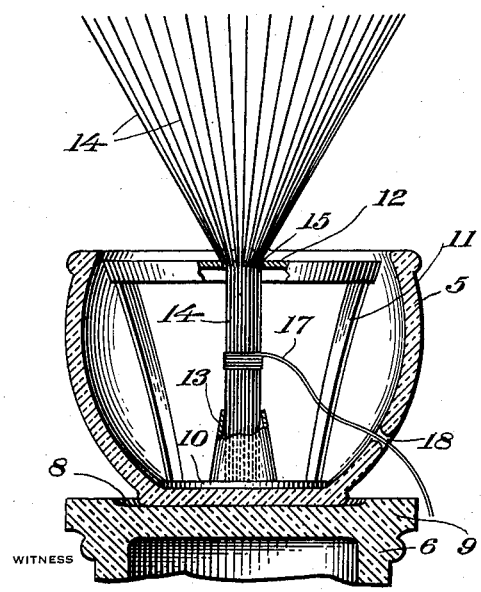
Figure 2 is a fragmentary transverse sectional view thereof.
Figure 3:
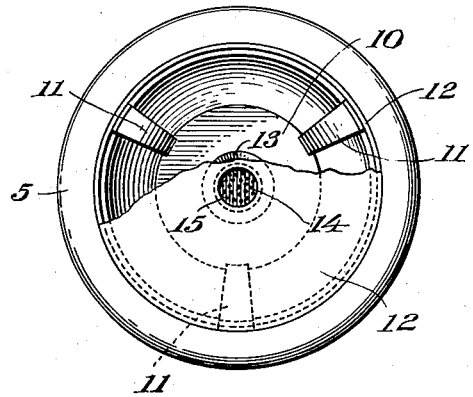
Figure 3 is a top plan view with parts thereof broken away.

Referring to the drawing for a more detailed description thereof, it will be noted that there is disclosed a bowl 5 preferably formed of wood or similar material supported upon a pedestal 6, the base of the pedestal comprising a stepped formation as indicated at 7. As shown in Figure 2 of the drawing, the bowl 5 rests within a recessed portion 8 formed in the top ledge 9 of the pedestal and said bowl may be permanently or removably attached therein by any desired means.

The bowl 5 provides the means for supporting a multiplicity of fine metal wires which, when connected with a radio receiver, forms an efficient aerial. A metallic disk 10 substantially equal in diameter to the interior diameter of the base of the bowl is supported on said base and is connected through the arcuately curved metallic strips 11 with a top disk 12 also formed of metal and substantially larger in diameter than the bottom disk 10. A cone-shaped socket 13, preferably formed of a metallic material is secured by any desired means substantially centrally of the bottom disk 10 and is adapted to receive therein one end of the multiplicity of conducting wires 14, said wires extending upwardly through an opening 15 formed substantially centrally of the top disk 12. The extending ends of the wires 13 are flared outwardly and are adapted to form stems for artificial flowers generally designated by the reference numeral 16. It is to be understood that the projecting ends of the wires which form stems for the artificial flowers are spread in a manner to present the appearance of a bouquet of flowers supported within the bowl 5.

The intermediate portion of the wires 13 disposed within the bowl 5 has connected thereto a lead-in wire 17, the opposite end of which is attached to the antenna connector of the radio receiver, said wire extending through an opening 18 formed in the side wall of the bowl 5.

The pedestal and bowl may be placed within a room and will form an attractive article for the same. With artificial flowers or the like mounted on the projecting ends of the wires the general attractiveness of the article is increased and in addition thereto a highly efficient indoor aerial is provided. By spreading the wires in the manner indicated, the improved aerial will receive radio waves from all directions with equal volume and in addition to this advantage, the aerial is neat in appearance and forms an attractive article to be placed in a room.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described, and therefore, such changes and modifications may be made therein as do not affect the spirit of the invention nor exceed the scope thereof as expressed in the appended claim.

What is claimed is:

An ornamental indoor aerial, comprising, a hollow open ended receptacle, an aerial supporting unit removably disposed within said receptacle, said unit including a disk supported upon the bottom wall of said receptacle for centering the unit therein, a second disk carried by and spaced from said first disk, said second disk normally lying in a plane substantially flush with the open end of said receptacle, said first disk being of substantially the same diameter as the bottom wall of said receptacle and said second disk being of substantially the same diameter as the open end of said receptacle, a socket formed on and projecting above said first disk, said second disk having an opening formed therein in alignment with said socket, a multiplicity of fine wires carried by said socket and extending fan-shaped through said opening above said receptacle, said wires being bunched in contacting relation within said socket, and a lead-in wire electrically connected with said bunched wires.

JACOB STEVENS.